(12) United States Patent
Chang

(10) Patent No.: US 7,364,344 B2
(45) Date of Patent: Apr. 29, 2008

(54) LAMP HOUSING AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,499

(22) Filed: Aug. 14, 2006

(65) Prior Publication Data
US 2007/0121344 A1 May 31, 2007

(30) Foreign Application Priority Data
Nov. 26, 2005 (CN) .................. 2005 1 0101805

(51) Int. Cl.
*F21V 7/04* (2006.01)
*G09F 13/04* (2006.01)
(52) U.S. Cl. .................. 362/633; 362/97; 362/613; 362/632
(58) Field of Classification Search ............. 362/633, 362/632, 634, 29, 611, 613, 614, 561, 600, 362/225, 240, 97, 640, 238, 249, 260, 222, 362/224, 615; 349/51, 62, 67, 70, 68, 60, 349/58, 59
See application file for complete search history.

(56) References Cited

U.S. PATENT DOCUMENTS 7,220,045 B2 * 5/2007 Chang .................. 362/633
7,223,003 B2 * 5/2007 Kim .................. 362/561
2004/0008512 A1 * 1/2004 Kim .................. 362/235
2004/0114395 A1 * 6/2004 Chan et al. .................. 362/560
2005/0013134 A1 * 1/2005 Yoo et al. .................. 362/235
2005/0018101 A1 * 1/2005 Choi et al. .................. 349/58
2006/0018130 A1 * 1/2006 Lee .................. 362/632
2006/0062015 A1 * 3/2006 Chung et al. .................. 362/600

FOREIGN PATENT DOCUMENTS

| CN | 1673828 A | 9/2005 |
|---|---|---|
| JP | 2004327449 A1 | 11/2004 |
| KR | 2003052948 A * | 6/2003 |

* cited by examiner

*Primary Examiner*—John Anthony Ward
*Assistant Examiner*—David R. Crowe
(74) *Attorney, Agent, or Firm*—Jeffrey T. Knapp

(57) ABSTRACT

An exemplary lamp housing includes a base (21), two frame members (23), and two frame holding members (24). The base includes an upper surface for disposing one lamp (20) thereon. The frame members are respectively attached to two opposite ends of the base so as to hold the lamp. Each of the frame members includes an outer side surface (232) and a lower outer surface (233). The frame holding members are each fixed on a corresponding one of the frame members so as to fix the frame members with the lamp. Each frame member includes a plurality of first protruding rims (2323) and second protruding rims (2324) extending from the outer side surface and down the lower outer surface. Each of the first protruding rims is parallel to one of the second protruding rims so as to define a receiving groove (2321) for mounting lamp wires connecting to the lamp.

19 Claims, 11 Drawing Sheets

LAMP HOUSING AND BACKLIGHT MODULE USING THE SAME

DESCRIPTION

1. Field of the Invention

The present invention relates to a lamp housing, and backlight module using the same, more particularly, to a bottom-lighting type backlight module for use in, for example, a liquid crystal display (LCD).

2. Discussion of the Related Art

In a liquid crystal display device, liquid crystal is a substance that does not itself illuminate light. Instead, the liquid crystal relies on reflecting light from a light source, thereby displaying images and data. In the case of a typical liquid crystal display device, a backlight module powered by electricity supplies the needed light.

Typically, there are two types of backlight modules: an edge lighting type and a bottom-lighting type. The edge-lighting type of backlight system is widely used in small and medium size liquid crystal displays on merits of its small weight, thin body and low energy cost. Large size liquid crystal display seldom uses the edge-lighting backlight system because the results based on the merits mentioned above is poor. Furthermore, the large size edge-lighting type backlight systems seldom satisfy the requirement of light brightness and optical uniformity. Currently, the market demand for larger size liquid crystal display has increased progressively, therefore, the bottom-lighting type of the backlight system needs to be developed to satisfy the market demand.

Referring to FIG. 1, a typical bottom-lighting type backlight module 100 is shown. The backlight module 100 includes a plurality of cold cathode fluorescent lamps 10 and a frame 11. Every cold cathode fluorescent lamp 10 has two electrodes (not shown); each electrode is further covered by an electrode holder 101. The electrode holder 101 is L-shaped. The frame 11 includes a flat base 110, a number of sidewalls 111 extending from two opposite edges of the base 110, and a plurality of holding members 12 disposed on the flat base 110. Each of the sidewalls 111 and its adjacent sidewall 111 cooperatively define a receiving gap 112 for receiving the electrode of the cold cathode fluorescent lamps 10. Two ends of the cold cathode fluorescent lamps 10 with the electrode holders 101 are inserted into the corresponding receiving gap 112 for securing the cold cathode fluorescent lamps 10 to the frame 11. The holding members 12 each have a holding pole 121 and two holding portions 122 disposed at the two sides of the holding pole 121. The holding pole 121 is used for supporting at least an optical sheet (not shown) disposed above of the frame 11. The holding portions 122 are used for clamping the cold cathode fluorescent lamps 10.

However, in large sized backlight module, lengths of the cold cathode fluorescent lamps 10 are significantly long. Longer cold cathode fluorescent lamps 10 will distort at a higher range than its maximum flexibility causing it to break when subjected to vibrations from the liquid crystal display device. The sidewalls 111 of the frame 11 are easy to distort, thus the frame 11 usually does not lend enough support to prevent the cold cathode fluorescent lamps from collapsing due to gravity. In addition, cold cathode fluorescent lamps 10 are not firmly fixed to the frame 11 by the sidewalls 111, thus the cold cathode fluorescent lamps 10 prone to released from the frame 11 by an out force. Further, the sidewalls 111 are inconvenient to manufacture so that the cost for manufacturing will be increased.

In another typical bottom-lighting backlight module, the bottom-lighting backlight module includes a plurality of lamp modules. The lamp modules each include several lamps and all the lamps are weld to a printing circuit board (PCB). This typical bottom-lighting backlight module is easy to assemble the lamp modules. However, if one of lamps is damaged, the whole lamp module needs to change.

What is needed, therefore, is a new lamp housing, and backlight module using the same that overcome the above mentioned disadvantage.

SUMMARY

In one aspect, a lamp housing includes a base, two frame members, and two frame holding members. The base includes an upper surface for disposing at least one lamp thereon. The frame members are respectively attached to two opposite ends of the base so as to hold the lamp. Each of the frame members includes an outer side surface and a lower outer surface. The frame holding members are each fixed on a corresponding on one of the frame members so as to fix the frame members together with the lamp. Each of the frame members includes a plurality of first protruding rims and second protruding rims extending from the outer side surface and down the lower outer surface. Each of the first protruding rims is parallel to one of the second protruding rims so as to define a receiving groove for mounting lamp wires connecting to the lamp.

In another aspect, a backlight module includes a base, a pair of frame members, a plurality of lamps, and a pair of frame holding members. The base includes two opposite base ends, and an upper surface spanning between the base ends. Each frame member is attached to a corresponding one of the base ends. Each frame member defines a plurality of lamp holding portions arranged along the corresponding one of the base ends. Each frame member includes an outer side surface and a lower outer surface perpendicular to the outer side surface. The lamps are oriented parallel to the upper surface. Each lamp has a pair of lamp fixing ends each structured for engaging with one corresponding lamp holding portion. The frame holding members are fixed on the frame members in a manner so as to fix the lamp fixing ends to the lamp holding portions. Each of the frame members includes a plurality of first protruding rims and second protruding rims extending from the outer side surface and down the lower outer surface. Each of the first protruding rims is parallel to one of the second protruding rims so as to define a receiving groove for mounting lamp wires connecting to the corresponding lamp.

Other advantages and novel features will become more apparent from the following detailed description of the preferred embodiments, when taken in conjunction with the accompanying drawings.

BRIEF DESCRIPTION OF THE DRAWINGS

Many aspects of the lamp housing and the backlight module can be better understood with reference to the following drawings. The components in the drawings are not necessarily drawn to scale, the emphasis instead being placed upon clearly illustrating the principles of the lamp housing and the backlight module. Moreover, in the drawings, like reference numerals designate corresponding parts throughout the several views.

DETAILED DESCRIPTION OF THE EMBODIMENTS

Reference will now be made to the drawings to describe preferred embodiments of the present lamp housing and backlight module using the same, in detail.

Figure 1:
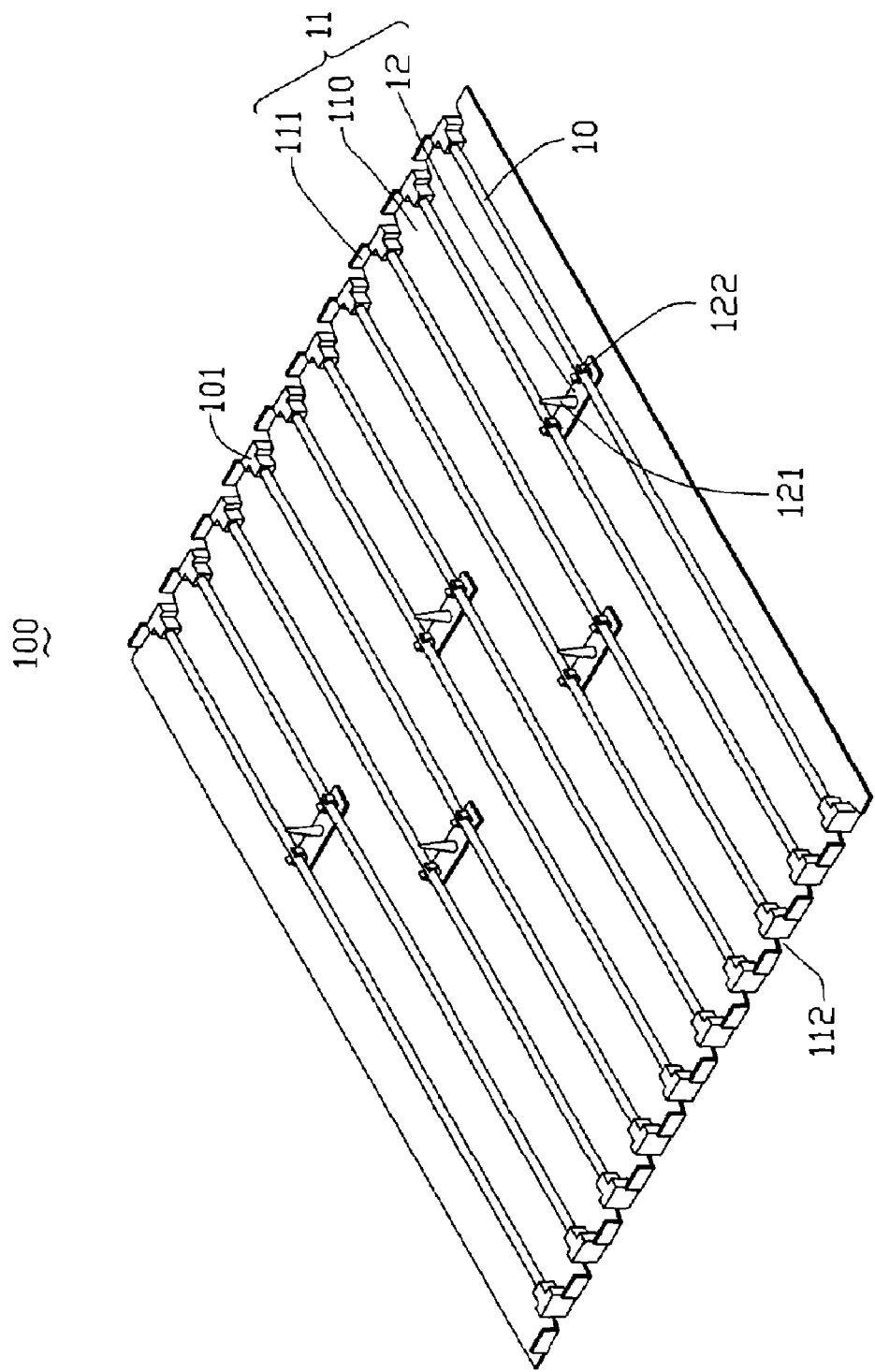
FIG. 1 is an assembled, isometric view of a conventional bottom-lighting type backlight module.
Figure 2:
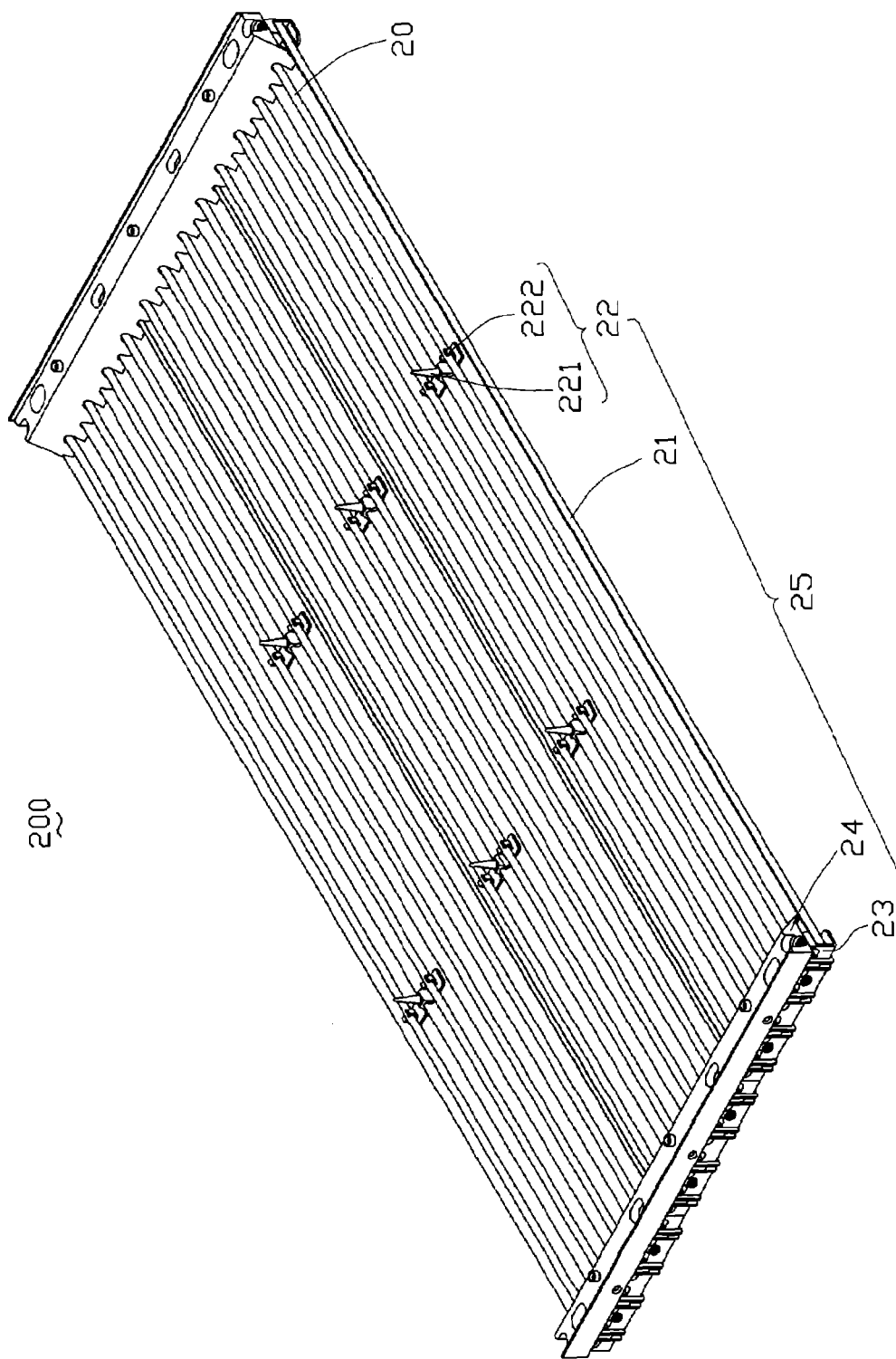
FIG. 2 is an assembled, isometric view of a backlight module according to one preferred embodiment.

Referring to FIG. 2, a backlight module 200 in accordance with a first preferred embodiment is shown. The backlight module 200 includes a plurality of lamps 20 and a lamp housing 25. The lamp housing 25 includes a base 21, a plurality of lamp-clamping members 22, a number of frame members 23, and two frame holding members 24. The lamps 20 are disposed on the base 21 in a parallel manner. The frame members 23 are aligned on two base ends that are on two opposite sides of the base 21 and the frame holding members 24 are fixed on the frame members 23 correspondingly.

In the first preferred embodiment, each of the frame members 23 is configured to hold four lamps 20. Each of the frame members 23 abuts against an adjacent frame member 23. It is to be understood that the number of lamps 20 that each of the frame members 23 can hold is not limited to four, i.e., the number of lamps 20 can be varied as necessary. The two base ends of the base 21 each have at least one of the frame holding member 24 fixed thereof. The total number of the frame holding members 24 is not limited to two, furthermore each of the at least one frame holding member may also be made up of several sub-members.

Figure 3:
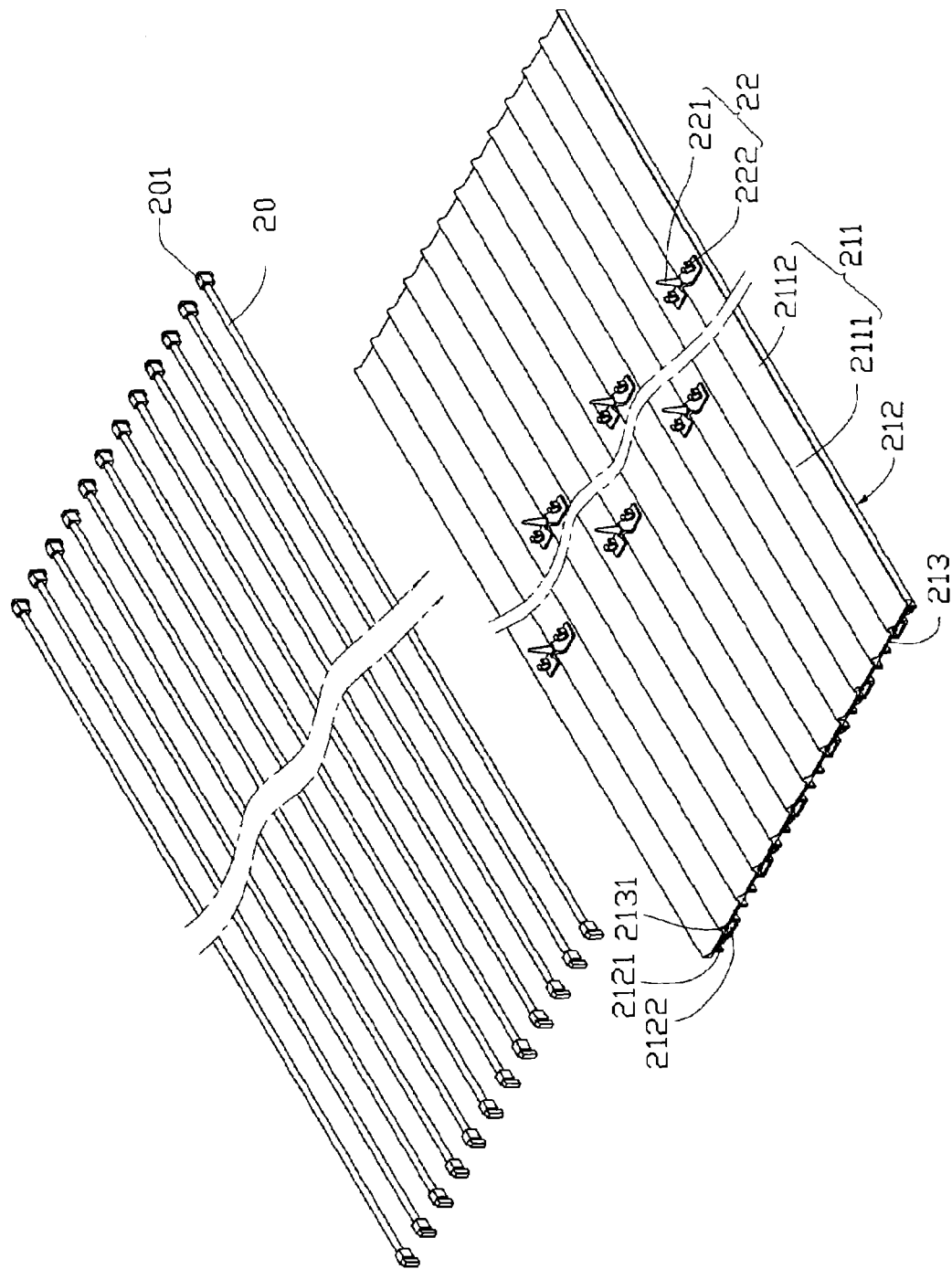
FIG. 3 is an exploded, isometric view of lamps and base of the backlight module of FIG. 2.

Referring to FIG. 3, the lamps 20 are cold cathode fluorescent lamps. Each of the plurality of lamps 20 has two lamp fixing ends. Each fixing end has an electrode (not shown) covered by an electrode holder 201. The electrode holders 201 are L-shaped.

The base 21 includes an upper surface 211, a bottom surface 212, and two opposite side latching surfaces 213. The upper surface 211 spanning between the base ends of the base 21. Each side latching surface 213 interconnects the upper surface 211 and the bottom surface 212. The base 21 defines a plurality of screw holes 2131 on the side latching surfaces 213. The base 21 is manufactured by extrusion or die-casting. The base 21 may be made of several separate bases connected to each other.

The base 21 further defines a plurality of elongated protruding portions 2111 on the upper surface 211 thereof extending along a direction perpendicular to the two opposite side latching surface 213. The screw holes 2131 are defined on the base 21 between every two adjacent elongated protruding portions 2111. Each of the elongated protruding portion 2111 and its adjacent elongated protruding portion 2111 cooperatively defines a concave groove 2111. The concave grooves 2112 receives a corresponding lamp 20 and is rectangular in shape, and may also be a V-shaped groove or an arched groove. The elongated protruding portions 2111 are configured to have a greater height than an altitude of the lamp 20 so that light emitting from two adjacent lamps 20 avoids interfering with each other.

The base 21 includes a plurality of cooling fins 2121 on the bottom surface 212 thereof extending along a direction parallel to the elongated protruding portions 2111, the cooling fins 2121 are used for increasing a heat dissipation area. A number of closing portions 2122 are disposed between every adjacent cooling fins 2121, thus, enhancing a structural strength of the lamp fame and increasing a heat dissipation area. The closing portions 2122 are not limited to being disposed between every adjacent cooling fins 2121 and may be disposed in other manners.

The lamp-clamping member 22 includes a supporting pole 221 and two wing portions. A clamp 222 is disposed on each wing portion of the lamp-clamping member 22. The functions of the lamp-clamping members 22 are the same as the holding members 12 in the typical bottom-lighting backlight module 100.

Figure 4:
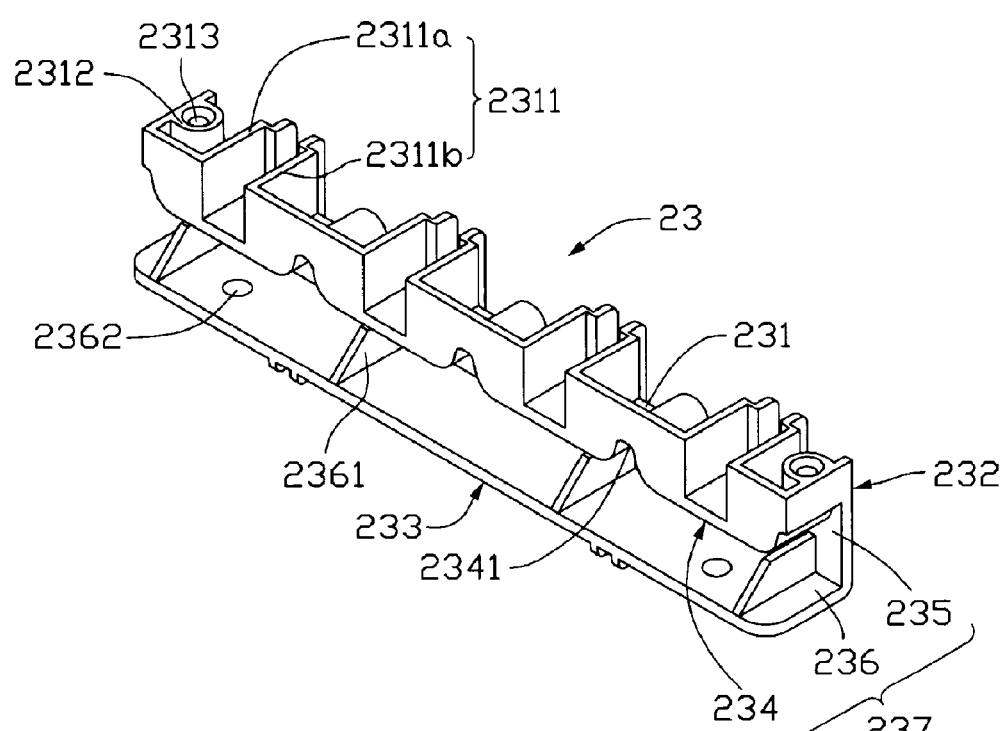
FIG. 4 is an enlarged, isometric view of a frame member of the backlight module shown in FIG. 2.

Referring to FIG. 4, the frame member 23 has a C-shaped structure 237 including an upper inner surface 234, a lower inner surface 236 and an inner side surface 235 interconnecting the upper inner surface 234 and the lower inner surface 236. The frame members 23 includes an upper outer surface 231 corresponding to the upper inner surface 234, a lower outer surface 233 corresponding to the lower inner surface 236, and an outer side surface 232 corresponding to the inner side surface 235.

The upper inner surface 234, the lower inner surface 236, and the inner side surface 235 cooperatively form a fixing space (not labeled) for the frame member 23 to mount onto the base 21.

Each frame member 23 has a plurality of protruding wall pairs 2311a and 2311b perpendicularly extending from the upper outer surface 231 to an outer area. The protruding wall pairs 2311a and 2311b are also perpendicular to the outer side surface 232. Each pair of the parallel protruding wall pairs 2311a and 2311b and a section of the upper outer surface 231 cooperatively define a lamp holding portion 2311 for receiving and securing the position the electrode holder 201 of the lamp 20. The lamp holding portions 2311 are U-shaped. Each frame member 23 has a pair of mounting poles 2312 extending perpendicularly at two opposite ends of the upper outer surface 231 thereof. Each mounting pole 2312 connects with the adjacent protruding walls 2311a or 2311b and further defines a screw hole 2313 therein.

The frame members 23 defines a plurality of receiving recesses 2341 on the upper inner surface 234 between the corresponding lamp holding portions 2311. A shape of each receiving recess 2341 is a U-shaped structure. Each of the receiving recesses 2341 corresponds to one elongated protruding portion 2111 of the base 21.

The frame members 23 each has a plurality of extending boards 2361 perpendicularly extending from the lower inner surface 236 towards upper inner surface 234; the extending boards 2361 are further also perpendicular to the outer side surface 232. A plurality of through holes 2362 is defined in the lower inner surface 236. The extending boards 2361 and the through holes 2362 are both configured for fixing the frame members 23 to the base 21.

Figure 5:
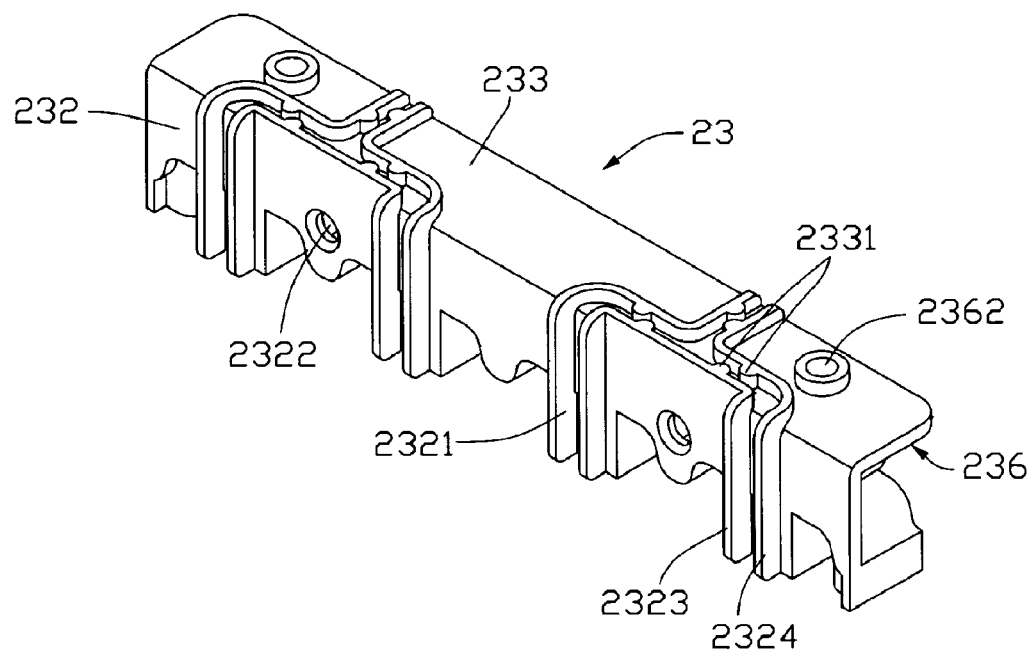
FIG. 5 is similar to of FIG. 4, but viewed from another direction.

Referring to FIG. 5, the frame member 23 includes two pairs of protruding rims 2323 and 2324 perpendicularly extending along the outer side surface 232 and the lower outer surface 233. A portion of the protruding rims 2323 and 2324 that extends along the outer side surface 232 is parallel to the extending boards 2361, and another portion of the protruding rims 2323 and 2324 that extends along the lower outer surface 233 is perpendicular to the extending boards 2361. The protruding rim 2323 is disposed parallel to the protruding rim 2324 so as to define a receiving groove 2321 for mounting lamp wires (not shown) connecting to electrodes of the lamps 20 thereat. The pair of receiving grooves 2321 runs parallel to each other on the outer side surface 232, then runs along the edge of the lower outer surface 233 towards each other before converging into one groove running perpendicular to the edge of the lower outer surface 233 forming a T-shape. Each of the protruding rims 2323 and 2324 has an inside wall (not labeled), and a block 2331 extending from the inside wall. The blocks 2331 extending from the protruding rims 2323 and 2324 are not aimed at each other so as to conveniently fix the lamp wires.

Figure 6:
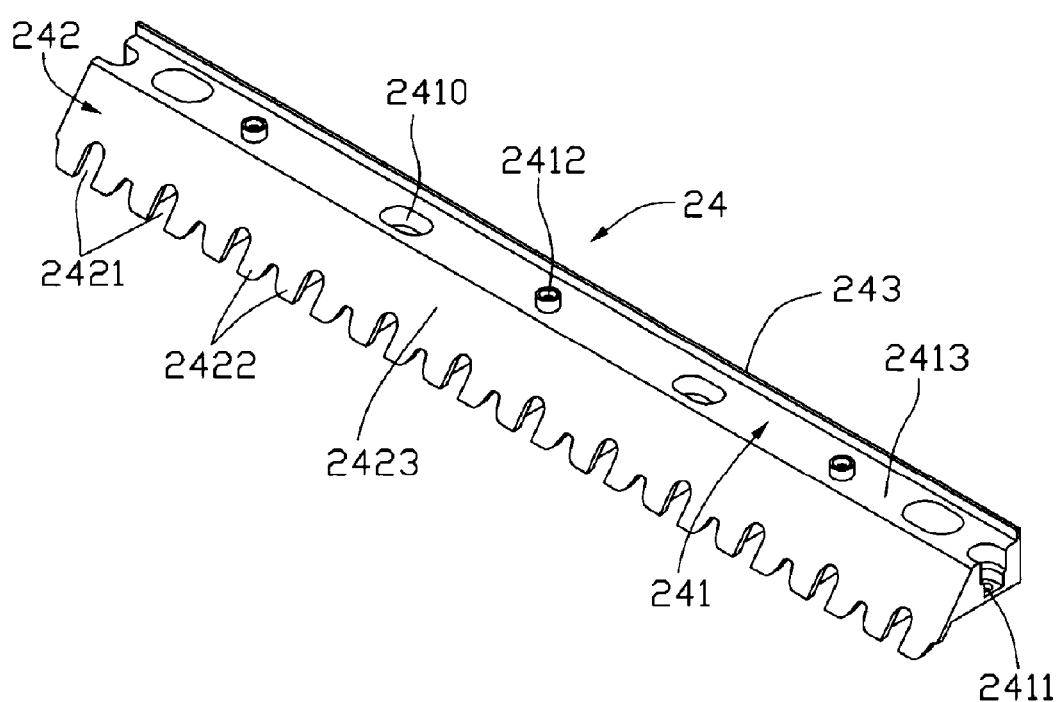
FIG. 6 is an enlarged, isometric view of a frame holding members of the backlight module shown in FIG. 2.

Referring to FIG. 6, the frame holding member 24 includes a front board 241, an inner side board 242, and an outer side board 243. The inner side board 242 and the outer side board 243 are both adjacent to the front board 241.

The front board 241 defines a plurality of mounting grooves 2410 and a plurality of screw holes 2412 therein. Each of the mounting grooves 2410 has a bottom surface (not labeled) and a mounting hole 2411 extending through a bottom surface thereof. The screw holes 2412 is adjacent to the mounting grooves 2410 and are used for mounting a diffusion sheet (not shown).

The inner side board 242 is connected to the front board 241 and has an obtuse angle relative to the front board 241. The inner side board 242 defines a plurality zigzag grooves 2421 in a lower end thereof, the zigzag grooves 2421 are corresponding to the elongated protruding portions 2111 of the base 21 and the lamps 20. A plurality of extending portions 2422 are disposed between every two zigzag grooves 2421 for engaging in the concave grooves 2112 of the base so as to supporting the frame holding member 24. The outer side board 243 extends perpendicularly from an edge of the front board 241 and is higher than a front surface 2413 of the front board 241 so as to fix the diffusion sheet or other optical elements to the frame holding member 24. The outer side board 243 defines a plurality of screw holes 2431 for fixing the backlight module 200 to an outer frame (not shown).

Figure 7:
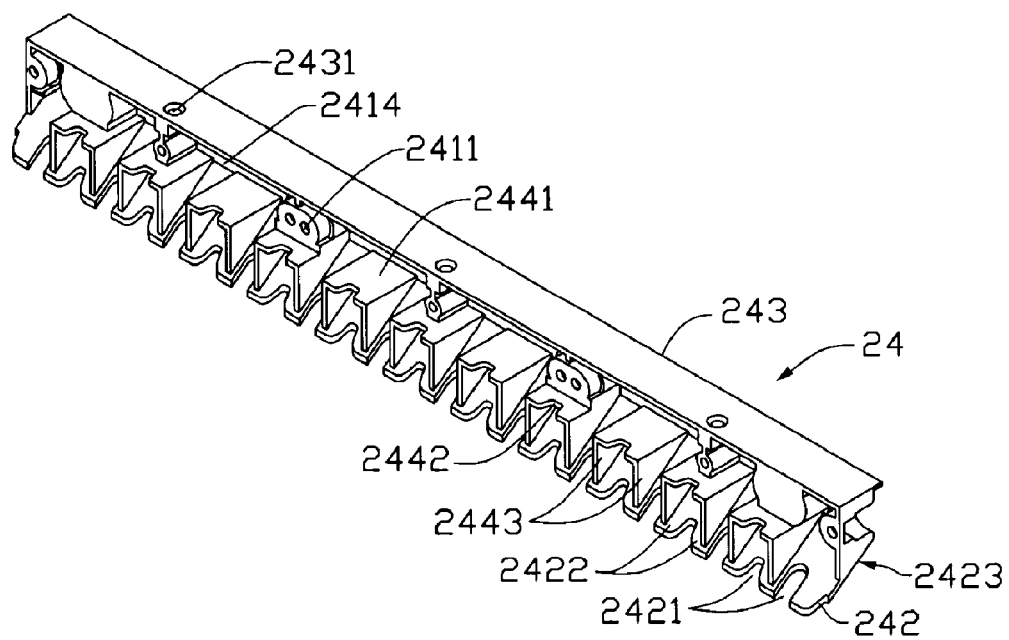
FIG. 7 is similar to FIG. 6, but viewed from another direction.

Referring together to FIG. 7, The frame holding member 24 further includes a plurality of holding boards 2441 extending from a ceiling 2414 that is an underside of the front surface 2413. A quantity of the holding boards 2441 corresponds to the quantity of the elongated protruding portions 2111 of the base 21. The holding boards 2441 are perpendicular to an underside of the front board 241 and are also parallel to the outer side board, and each define an inverted U-shaped mouth 2442 that is configured for engaging with the elongated protruding portions 2111 of the base 21. Each support board 2443 extends from each a vertical edge the holding board 2441 connecting the inner side board 242. The holding boards 2441 and the support boards 2443 are configured for enhancing a structural strength of the inner side board 242, thus the frame holding member 24 has larger mechanical strength.

Figure 8:
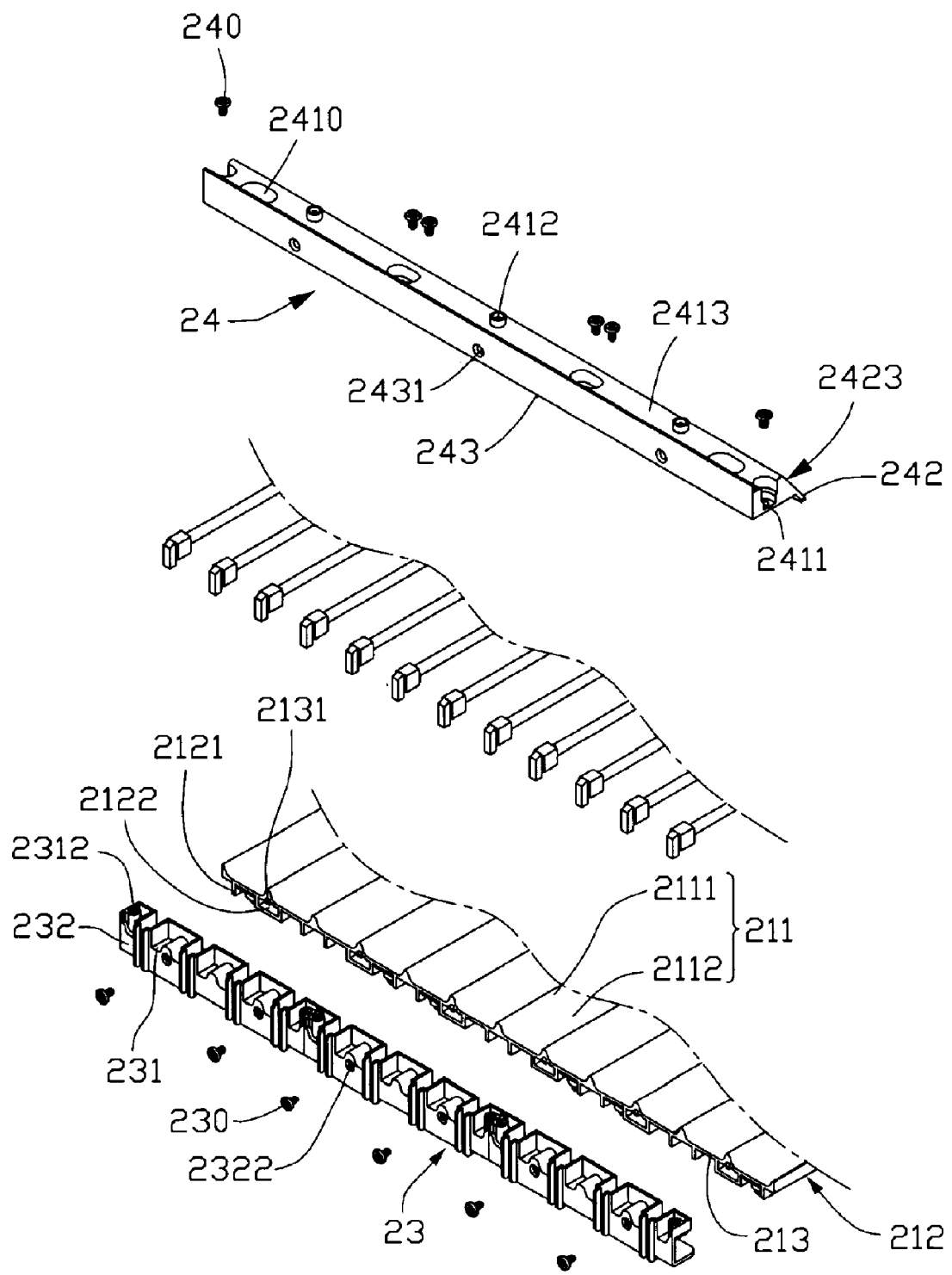
FIG. 8 is an enlarged, partially exploded isometric view of the backlight module shown in FIG. 2.
Figure 9:
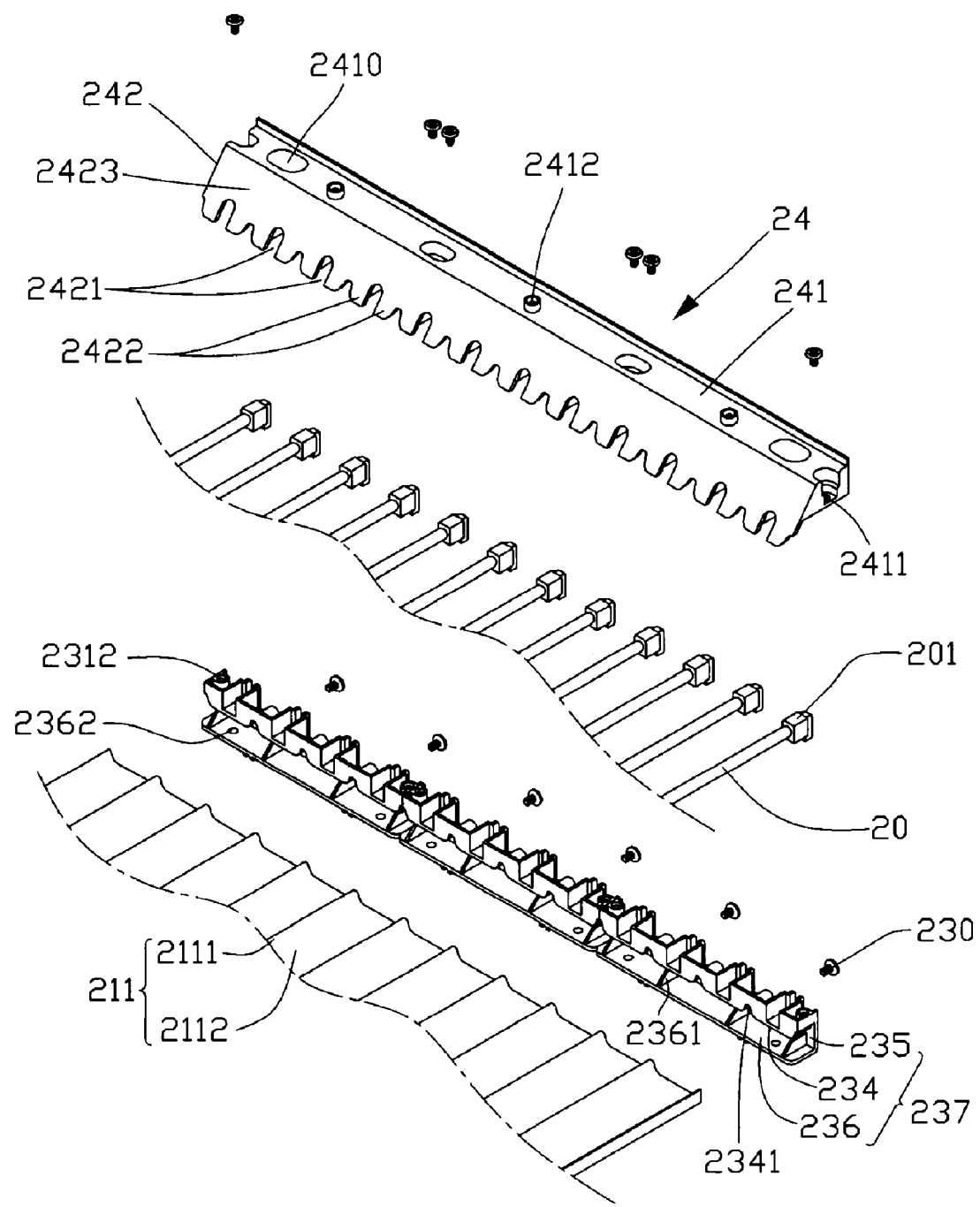
FIG. 9 is similar to FIG. 8, but viewed from another direction.

Referring together to FIGS. 8 and 9, in assembly of the backlight module 200, the C-shaped structure 237 of the frame member 23 is aligned with the side walls 213 of the base 21 such that the base 21 and the frame member 23 are connected to each other at the fixing space defined in the C-shaped structure 237. When the base 21 and the frame member 23 are connected to each other at the fixing space defined in the C-shaped structure 237, the upper inner surface 234 engages with the upper surface 211 of the base 21, the lower inner surface 236 engages with the bottom 212 of the base 21, and the inner side surface 235 engages with the side walls 213 of the base 21.

A distance between the upper inner surface 234 and the lower inner surface 236 of the C-shaped structure 237 is equal to or slightly greater than a lesser of two vertical distances measured between a surface of the concave grooves 2112 and a lowest portion of the cooling fins 2121 and between the surface of the concave grooves 2112 and a lowest portion of the closing portions 2122. The C-shaped structure 237 defines the receiving recesses 2341 on the upper inner surface 234 for engaging with the elongated protruding portions 2111 of the base 21. Therefore, the base 21 and the frame members 23 are conveniently latched to each other and not easily moved. The C-shaped structure 237 includes a plurality of extending blocks 2361 extending from the upper inner surface 234. The height of the extending blocks 2361 is equal to or slightly greater than a lesser of two distances that corresponds to a height of the cooling fins 2121 and a vertical distance measured between the bottom 212 and the lowest portion of the closing portions 2122 so that the frame members 23 are firmly fixed to the base 21.

The frame members 23 each defines a plurality of screw mounting holes 2322 on the outer side surface 232 corresponding to the screw holes 2131 defined in the side walls 213 of the base 21. Each of the screw mounting holes 2322 connects the outer side surface 232 and the inner side surface 235 of each C-shaped structure 237. A plurality of screws 230 are received in the screw mounting holes 2322 and the screw holes 2131 so as to fix the frame members 23 to the base 21. The numbers of the screw mounting holes 2322, the screw holes 2131 and the screws are all the same and are selected according to a requiring strength in fact, but doe not limit to this embodiment.

The front board 241 of the frame holding member 24 is parallel to the upper outer surface 231 of the frame members 23. The mounting holes 2411 correspond to the screw holes 2313 of the mounting poles 2312 of the frame members 23. A plurality of screws 240 are received in the mounting holes 2411 and the screw holes 2313 correspondingly so as to fix the frame holding members 24 to the frame members 23. Each of the mounting grooves 2410 defined in the frame holding members 24 has a depth greater than a height of a screw cap of each screw 240, thus the screw cap of each screw 240 is completely received in the mounting grooves 2410 and cannot get out of the front surface 2413 of the front board 241.

The inner side board 242 has an outer surface 2423 connected to the front surface 2413 of the front board 241. The outer surface 2423 is a smooth surface aslant disposed on the inner side board 242 so as to perpendicularly reflect lights emitting from the lamps 20. The zigzag grooves 2421 in the lower end of the inner side board 242 are configured for conveniently connecting the inner side board 242 to the base 21 and the zigzag grooves 2421 are also used for fixing the lamps 20.

Figure 10:
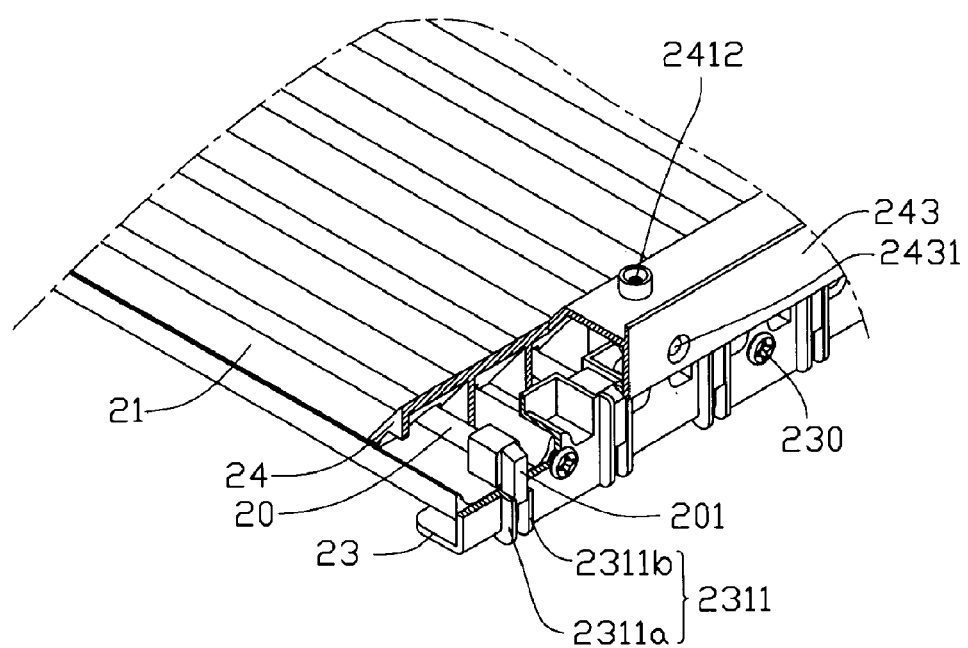
FIG. 10 is a schematic, assembled, partially cut away view of the backlight module shown in FIG. 2.

Referring to FIG. 10, the lamp fixing ends of the lamp 20 together with the electrode holders 201 of the backlight module 200 are received in the lamp holding portions 2311 of the frame members 23. A height of the extending walls 2311a and 2311b is slightly greater than the height of the electrode holder 201 so as to protect the electrode holder 201. A width of the lamp holding portions 2311 of the frame members 23 is equal to or slightly smaller than a width of the electrode holder 20 for the lamp holding portions 2311 to fix the lamps 20.

Figure 11:
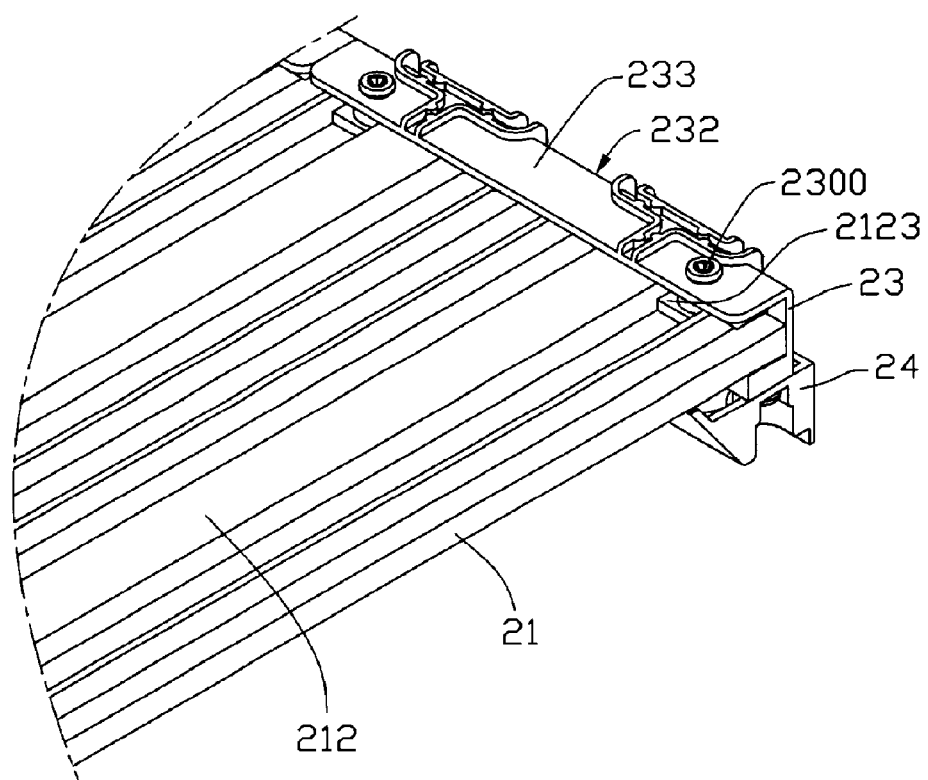
FIG. 11 is a schematic, partially assembled view similar to FIG. 10, but viewed from another direction.

Referring to FIG. 11, the base 21 has a plurality of extending portions 2123 extending from the bottom 212. Each of the extending portions 2123 defines a fixing hole (not shown) corresponding to each of the through holes 2362 of the frame members 23. A plurality of screws 2300 are received in the through holes 2362 and the fixing holes in the extending portions 2123 so as to lock the frame members 23 to the base 21.

Compared with the typical bottom-lighting backlight module 100, the lamp housing 25 of the backlight module 200 includes the frame holding members 24 and the frame members 23 for fixing the lamps 20 to the base 21, thus the backlight module 200 does not need a number of sidewalls extending from two ends of the base 21 for securing the frame holding members 24. Therefore, the lamps 20 can be firmly fixed to the base 21 and the structural strength of the lamp housing 25 is also enhanced. The lamps 20 are convenient to disassemble from the frame members 23, thus the backlight module 100 has a better practicability. In addition, the upper outer surface 231 of the frame members 23 is smooth enough for a diffusing plate (not shown) to be directly disposed on the frame members 23, and does not need an extra smooth frame for deposing the diffusing plate.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lamp housing comprising:
   a base including an upper surface for disposing at least one lamp thereon;
   at least two frame members respectively attached to two opposite ends of the base so as to hold the at least one lamp, each of the at least two frame members including an outer side surface and a lower outer surface perpendicular to the outer side surface; and
   at least two frame holding members each fixed on a corresponding one of the frame members so as to fix the frame members together with the at least one lamp;
   wherein each of the at least two frame members includes a plurality of first protruding rims and second protruding rims extending from the outer side surface and down the lower outer surface, and each of the first protruding rims is parallel to one of the second protruding rims so as to define a receiving groove for mounting lamp wires connecting to the at least one lamp.

2. The lamp housing according to claim 1, wherein the base includes two opposite side latching surfaces perpendicular to the upper surface, and a plurality of elongated protruding portions extending along a direction perpendicular to the two opposite side latching surfaces.

3. The lamp housing according to claim 2, wherein the base further includes a bottom surface, and a plurality of cooling fins extending from the bottom surface for increasing a heat dissipation area.

4. The lamp housing according to claim 2, further comprising a plurality of lamp-clamping members on the base, wherein the at least one lamp is at least two lamps, and each lamp-clamping member includes a supporting pole having two wing portions, and two clamps disposed at the two wing portions of the supporting pole for clamping two lamps.

5. The lamp housing according to claim 2, wherein each of the frame members has a C-shaped structure for fixing the frame members to the base, the C-shaped structure includes an upper inner surface, a lower inner surface, and an inner side surface, the upper inner surface faces the lower inner surface, and the inner side surface is adjacent to the upper inner surface and the lower inner surface.

6. The lamp housing according to claim 5, wherein the upper inner surface, the lower inner surface and the inner side surface cooperatively define a fixing space for fixing the frame member to the base.

7. The lamp housing according to claim 5, wherein each of the frame members includes an upper outer surface corresponding to the upper inner surface, the lower outer surface of the frame member corresponds to the lower inner surface, and the outer side surface corresponds to the inner side surface.

8. The lamp housing according to claim 7, wherein each of the frame members has a plurality of pairs of extending walls perpendicularly extending from the upper outer surface thereof, each pair of the parallel extending walls and parts of the upper outer surface cooperatively define a U-shaped lamp holding portion, and the at least one lamp has an electrode holder received in the lamp holding portion.

9. The lamp housing according to claim 8, wherein each of the frame members defines a plurality of receiving hollows between the lamp holding portions, each of the receiving hollows is adjacent to the upper inner surface of the C-shaped structure, and each of the receiving hollows corresponds to one of the elongated protruding portions.

10. The lamp housing according to claim 8, wherein the base further includes a bottom surface, each of the two opposite side latching surfaces interconnects the upper surface and the bottom surface, each of the two opposite latching surfaces defines a plurality of screw holes, and the frame members define a plurality of screw mounting holes corresponding to the screw holes.

11. The lamp housing according to claim 10, wherein each of the screw mounting holes is exposed at the outer side surface and the inner side surface of the C-shaped structure, and a plurality of screws are received in the screw mounting holes and the screw holes so as to fix the frame members to the base.

12. The lamp housing according to claim 2, wherein each of the frame holding members includes a front board, an inner side board, and an outer side board, the inner side board and the outer side board are both adjacent to the front board, and the inner side board connects to the front board and forms an obtuse angle relative to the front board.

13. The lamp housing according to claim 12, wherein the at least one lamp is at least two lamps, the inner side board of each of the frame holding members defines a plurality of zigzag grooves in a lower end thereof, and the zigzag grooves correspond to the elongated protruding portions of the base and the lamps.

14. The lamp housing according to claim 13, wherein the base defines a plurality of concave grooves, and a plurality of extending portions are disposed between every two zigzag grooves of the inner side board of each of the frame holding members for engaging in the concave grooves of the base so as to support the frame holding member.

15. A backlight module comprising:
a base having two opposite base ends, and an upper surface spanning between the base ends;
a pair of frame members each attached to a corresponding one of the base ends, each frame member defining a plurality of lamp holding portions arranged along the corresponding one of the base ends, and each frame member including an outer side surface and a lower outer surface perpendicular to the outer side surface;
a plurality lamps oriented parallel to the upper surface, each lamp having a pair of lamp fixing ends each structured for engaging with one corresponding lamp holding portion; and
a pair of frame holding members fixed on the frame members in a manner so as to fix the lamp fixing ends to the lamp holding portions;
wherein, each of the frame members includes a plurality of first protruding rims and second protruding rims extending from the outer side surface and down the lower outer surface, and each of the first protruding rims is parallel to one of the second protruding rims so as to define a receiving groove for mounting lamp wires connecting to the lamps.

16. The backlight module according to claim 15, wherein the base further includes two opposite side latching surfaces perpendicular to the upper surface, a plurality of elongated protruding portions extending from the upper surface, a bottom surface, and a plurality of cooling fins extending from the bottom surface for increasing a heat dissipation area.

17. The backlight module according to claim 15, wherein each of the frame members includes a C-shaped structure for fixing the frame member to the base, the C-shaped structure includes an upper inner surface, a lower inner surface, and an inner side surface, the upper inner surface faces the lower inner surface, the inner side surface is adjacent to the upper inner surface and the lower inner surface, the lower outer surface corresponds to the lower inner surface, and the outer side surface corresponds to the inner side surface.

18. The backlight module according to claim 17, wherein each of the lamp holding portions includes a U-shaped groove.

19. The backlight module according to claim 16, wherein each of the frame holding members includes a front board, an inner side board, and an outer side board, the inner side board and the outer side board are both adjacent to the front board, the inner side board connects to the front board and forms an obtuse angle relative to the front board, the inner side board defines a plurality of zigzag grooves in a lower end thereof, the zigzag grooves correspond to the elongated protruding portions of the base and the lamps, the base defines a plurality of concave grooves, and a plurality of extending portions are disposed between every two zigzag grooves for engaging in the concave grooves of the base so as to support the frame holding member.

* * * * *